(No Model.)
F. J. BRAGUNIER.
ANIMAL TRAP.
No. 518,483.  Patented Apr. 17, 1894.
Fig. 1.
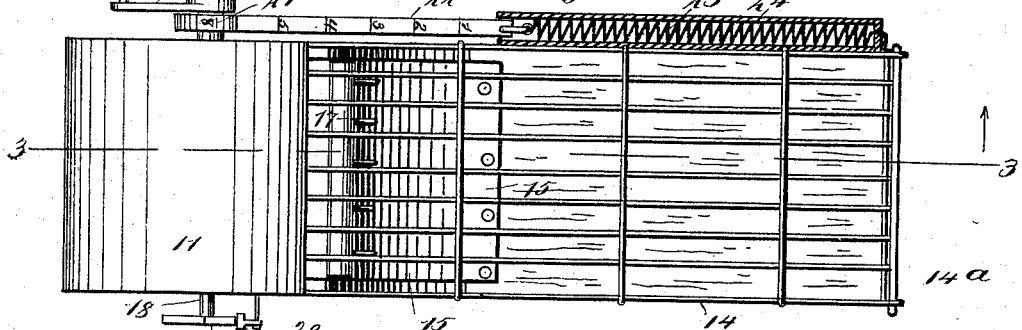
Fig. 2.
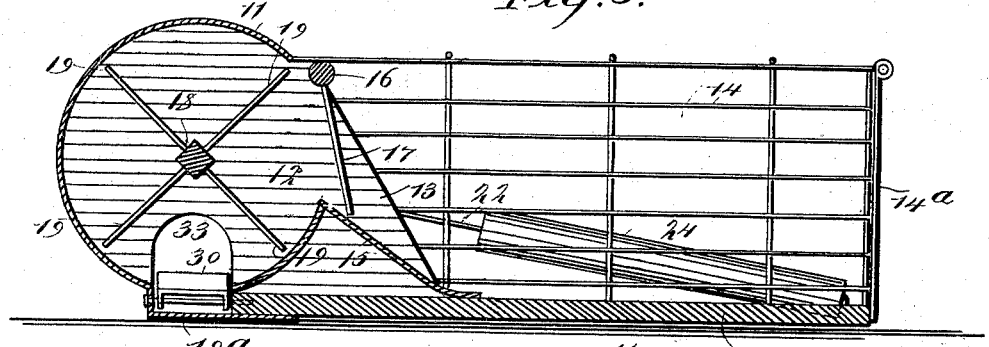
Fig. 3.
Fig. 4.
WITNESSES:
F. McArdle.
E. M. Clark.
INVENTOR
F. J. Bragunier
BY
Munn & Co.
ATTORNEYS.

UNITED STATES PATENT OFFICE.

FRANK J. BRAGUNIER, OF TOPEKA, KANSAS.

ANIMAL-TRAP.

SPECIFICATION forming part of Letters Patent No. 518,483, dated April 17, 1894.

Application filed September 19, 1893. Serial No. 485,846. (No model.)

*To all whom it may concern:*

Be it known that I, FRANK J. BRAGUNIER, of Topeka, in the county of Shawnee and State of Kansas, have invented a new and Improved Animal-Trap, of which the following is a full, clear, and exact description.

My invention relates to improvements in that class of traps which are used for catching animals and small game, and the object of my invention is to produce a simple form of trap which may be conveniently set, which is adapted to catch the game alive, and which when once set and baited will operate many times without re-setting.
To these ends my invention consists in certain features of construction and combinations of parts, which will be hereinafter described and claimed.

Reference is to be had to the accompanying drawings, forming a part of this specification, in which similar figures of reference indicate corresponding parts in all the views.

Figure 1 is a side elevation of a trap embodying my invention. Fig. 2 is a plan view of the same. Fig. 3 is a longitudinal section on the line 3—3 in Fig. 2; and Fig. 4 is a cross section on the line 4—4 in Fig. 1.

The trap is provided with a suitable flat base 10, at one end of which is a nearly cylindrical bait box 11, which has closed ends 12 except for the passages through said ends as hereinafter described.

In one side of the bait box 11 is an opening 13 through which communication is made to a cage 14 on the base 10, in which cage the game is thrown as hereinafter described, and the cage has at one end a suitable door 14ª to provide for removing the game. A guard plate 15 preferably closes the side of the cylinder next the cage 14, and above this is a trap door which extends across the opening 13, this door comprising a cross bar 16, which is journaled on the ends of the cylinder, and depending arms 17 which lie normally against the guard plate 15, and the weight of which is sufficient to close the door.

It will be observed by reference to Fig. 3, that the door may swing freely in one direction so as to permit it to be opened from the bait box, but it cannot be opened by pressure from the opposite direction, consequently, when an animal has been deposited in the cage 14 it cannot get back into and escape by way of the bait box.

Journaled centrally in the bait box 11, and extending from end to end, is a shaft 18 which is provided with radiating parallel arms 19, there being six sets of these arms, but a greater or less number of sets may be used if desired. The shaft 18 has at one end a crank 20 by means of which it may be turned in one direction, and it is also provided with a pulley 21, to which a belt 22 is attached and on which the belt is adapted to wind. The other end of the belt connects with a spring 23 which is held in a spring barrel 24, and is fastened to the base 10. It will thus be seen that by turning the crank the belt may be wound upon the pulley 21, and if the crank is released the tension of the spring unwinds the belt and turns the shaft back. Means to be presently described are employed to permit the shaft to turn only far enough under tension of the spring to cause one set of arms 19 to spring quickly by the passage to the bait box every time the trap is sprung, and the belt 22 is numbered and provided with gage marks, as shown in Fig. 2, these marks being the same distance apart that the belt moves to carry the arms 19 the requisite distance, and hence by reference to the belt it may be at once ascertained how many times the trap has been sprung.

The shaft 18 is provided at one end with a ratchet wheel 25 to enable the revolutions of the shaft to be controlled, the number of teeth on the wheel corresponding with the number of sets of arms 19 on the shaft, and the ratchet wheel is engaged by a pawl 26, which prevents the ratchet wheel and shaft from revolving under the tension of the spring 23, this pawl being formed on a rod 27, which is fulcrumed on one end of the bait box, as shown at 28, and which is bent laterally and downwardly so as to clear the opening to the bait box. At its lower end the rod 27 connects with a lug 29 on one end of a tripping platform 30, which is fulcrumed near the center, as shown at 31, and extends through the bait box from end to end, the platform being pressed upward at one end by a spring 32, which is arranged beneath it, and this causes the opposite end to be pulled down so as to hold the pawl 26 in engagement with the ratchet wheel. It will be observed that the floor 19ª of the bait box at a point beneath the platform 30 is lower than the top of the base 10, thus enabling the platform to lie low so that an animal may readily walk upon it.

The bait box 11 is provided at its ends with openings 33 which are opposite the tripping platform 30, and an animal on looking into the box will have an idea that he can walk freely through, and will therefore more readily enter it than he would if the opening was on one side only.

The box is usually provided with bait which is placed on the higher end of the platform 30, although it may be arranged in any convenient way within the box, and when an animal discovers the bait he walks through the opening and up the platform 30; but just before he reaches the bait the upper end of the platform is pushed downward by the weight of the animal, and this causes the rod 27 to be raised so as to swing the pawl 26 out of engagement with the ratchet wheel 25. The shaft 18 is then turned quickly, being impelled by the spring 23, and a set of arms 19 strikes the animal and throws him through the opening 13, the trap door swinging inward to permit the animal to pass to the cage 14, in which he is kept safely, as the trap door cannot be pushed back. As soon as the animal is swept from the platform 30, the latter immediately resumes its normal position and swings back the pawl 26 which engages the ratchet wheel and stops the shaft, thus leaving the trap ready for another operation.

Having thus described my invention, I claim as new and desire to secure by Letters Patent—

1. An animal trap, comprising a bait box provided with an entrance opening, a tripping platform located in the bait box, a cage arranged laterally of the bait box, a swinging door controlling the passage from the bait box to the cage, a spring-revolved shaft journaled in the bait box, a ratchet wheel secured to the said shaft, a pawl operatively connected with the tripping platform and adapted to engage the ratchet wheel, and a series of arms carried by the shaft in the bait box, as and for the purpose set forth.

2. An animal trap, comprising a bait box provided with an entrance opening, a tripping platform located in the bait box, a cage arranged laterally of the bait box, a swinging door controlling the passage from the bait box to the cage, a spring-revolved shaft journaled in the bait box, a ratchet wheel secured to the said shaft, exteriorly of the box, a pawl for the ratchet wheel, a bent rod connecting the platform with the pawl and constructed to clear the entrance opening of the bait box, and a series of arms secured to the said shaft within the bait box, as and for the purpose set forth.

3. An animal trap, comprising a bait box provided with an entrance opening, a tripping platform located in the bait box, a stationary inclined guard plate rigidly secured to the bottom of the trap between the cage and the bait box, a swinging door extending from the top of the trap to the said guard plate and controlling the passage from the bait box to the cage, a spring-revolved shaft journaled in the said box, an operative connection between the platform and the shaft, and a series of arms carried by the said shaft in the bait box, substantially as described.

4. The combination, with the revoluble shaft and the radiating arms thereon, of a ratchet mechanism for holding the shaft, a belt connected with the shaft and having numbers and gage marks produced thereon, and a spring secured to an adjacent support and to the outer end of the belt, substantially as specified.

FRANK J. BRAGUNIER.

Witnesses:
P. M. BRAGUNIER,
CURT HERRMANN.